US005099244A

United States Patent [19]

Larson

[11] Patent Number: 5,099,244

[45] Date of Patent: Mar. 24, 1992

[54] SUPPORT PYLON FOR RADAR CROSS-SECTION MODEL TESTING

[75] Inventor: Clayton J. Larson, North Hollywood, Calif.

[73] Assignee: Lockheed Corporation, Calabasas, Calif.

[21] Appl. No.: 562,877

[22] Filed: Aug. 6, 1990

[51] Int. Cl.[5] ........................ H01Q 17/00; G01S 7/40

[52] U.S. Cl. ........................................ 342/165; 342/1; 342/4

[58] Field of Search ................................ 342/165, 1, 4

[56] References Cited

U.S. PATENT DOCUMENTS 4,879,560 11/1989 McHenry .............................. 342/5
4,947,175 8/1990 Overholser ........................ 342/165

*Primary Examiner*—Thomas H. Tarcza
*Assistant Examiner*—John B. Sotomayor
*Attorney, Agent, or Firm*—Louis L. Dachs

[57] ABSTRACT

The invention is a pylon for supporting a model above a ground plane for radar cross-section testing using a radar providing a specific frequency range and power distribution above the ground plane. In detail, the pylon comprises a column made of a low dielectric constant foam material having a base end for mounting on the ground plane, a model mounting top end and a generally circular cross-section. The column has an abrupt change in diameter at a point between the ends forming a step and dividing the column into upper and lower tapered portions with each of the portions having a specific diameter range. The step is located at a point on the column such that the power is evenly split between the upper and lower portions and the specific diameter ranges of the portions are selected to maintain a 180-degree phase change in the return signal from each of the portions reducing the RCS of the pylon.

5 Claims, 3 Drawing Sheets

FIG. 5

| FREQUENCY (MHz) | RCS (dB) | | | |
|---|---|---|---|---|
| | PRIOR ART TAPERED PYLON | | STEPPED PYLON | |
| | H POL 1 | E POL 2 | H POL | E POL |
| 350 | 28 | 34 | 32 | 34 |
| 400 | 24 | 24 | 47 | 55 |
| 450 | 27 | 31 | 45 | 48 |

1. H-POL = MAGNETIC FIELD
2 E-POL = ELECTRIC FIELD

| DIMENSION | | VALUE (FT.) | REMARKS |
|---|---|---|---|
| OVERALL HEIGHT | 22 | 14.0 | DETERMINED BY AVAILABLE SIZE OF FOAM BLOCK |
| HEIGHT OF UPPER PORTION | 34 | 4.3 | SELECTED TO PROVIDE A 50% SPLIT OF POWER BETWEEN UPPER AND LOWER PORTIONS OF PYLON |
| HEIGHT OF LOWER PORTION | 28 | 9.7 | |
| TOP DIA. OF UPPER PORTION | 25 | 2.0 | PARTLY CONTROLLED BY LOADS INDUCED BY MODEL |
| BASE DIA. OF UPPER PORTION | 32 | 2.4 | MAXIMUM DIA. BEFORE PHASE SHIFT AT 450 MHz |
| TOP DIA OF LOWER PORTION | 25 | 3.10 | MINIMUM DIA. AFTER A PHASE SHIFT AT 350 MHz |
| BASE DIA. OF LOWER PORTION | 24 | 3.4 | END OF OVERLAP. HOWEVER MAY EXTEND PAST PHASE CHANGE WITH LITTLE EFFECT ON RCS |

FIG. 4

PYLON FOR TESTING MODEL AT 350-450 MHz RANGE

SUPPORT PYLON FOR RADAR CROSS-SECTION MODEL TESTING

BACKGROUND OF THE INVENTION

1. Field of the Invention

The invention generally relates to the field of test equipment for the determination of the radar cross-section (RCS) of models and, in particular, to support pylons for the model.

2. Description of Related Art

There are several ways to support radar targets on an instrumentation radar range. These include metal ogival pylons, string supports and low density foam pylons. Each approach has its advantages and disadvantages, but the major requirement of any support pylon is to have a lower radar cross-section (RCS) than the model target that is measured. Foam pylons have a low RCS because they appear to be almost transparent to the radar and, thus, are ideal for measuring small, low-weight models. With a dielectric constant of about 1.04, the surface reflection coefficient is about 0.01 or 40 dB below a metal surface. For example, the RCS of a 2-foot diameter foam pylon, 14 feet in height, can be found by reducing the RCS of a metal pylon about 40 dB. The RCS at normal incidence to a metal cylinder can be calculated by use of the formula:

$$RCS = \frac{2\pi r L^2}{\lambda}$$

where: L = length of pylon
r = radius of pylon
λ = frequency of the radar

At 400 mhz the RCS is about 20 dBsm. Subtracting 40 dB gives an RCS of −20 dBsm. The worst case occurs when the diameter of the cylinder is about one-quarter wave length, which will cause the RCS to raise by 6 dB or to −14 dBsm.

The simple cylindrical pylon's RCS may not be low enough in some test situations. However, by tapering the cylindrical pylon, the radar does not view the cylinder at normal incidence so the RCS can be significantly reduced. This concept holds true except at low frequencies where the change in diameter is less than a wavelength. But tapering has some practical limitations. The model weight determines the diameter at the top and, for most practical models, the minimum diameter is typically limited to about 2 feet. Therefore, the only alternative is to increase the diameter of the base. However, there is a limit on the available size of foam blocks. Gluing blocks together does not work well because the RCS of the glue joint is generally larger than the RCS of the pylon.

Another approach is to design the pylon to take advantage of phase cancellation by alternating surface diameters of the pylon (forming a serrated cylindrical surface) with the surfaces separated by one-quarter wave length. However, such pylons are difficult to make and the scattering from the corners is high. A better approach is to taper the pylon so that the top of the pylon phase cancels the bottom of the pylon. However, while the RCS is improved, the bandwidth is limited.

Thus, it is a primary object of the subject invention to provide a support pylon for RCS testing of a model.

It is another primary object of the subject invention to provide a support pylon for RCS testing of a model at low frequencies.

It is a further object of the subject invention to provide a support pylon for RCS testing or a model over a somewhat broad, low-frequency band.

It is a still further object of the subject invention to provide a support pylon made of foam for RCS testing of a model that is inexpensive to manufacture.

SUMMARY OF THE INVENTION

The invention is a pylon for supporting a model above a ground plane for RCS testing using a radar providing a specific frequency range. In detail, the invention comprises a low dielectric foam column having a generally circular cross-section that is tapered from the base end, for mounting on the ground plane, to an upper end for mounting the model. The pylon further includes an abrupt change in diameter along its length from the bottom end to the upper end forming a step dividing the pylon into upper and lower tapered portions. On ground plane radar ranges there is a cosine amplitude or power distribution taper where the power increases from almost zero at the ground plane to a maximum some distance there above. Thus, the pylon illumination varies in a similar manner from the bottom end to the upper end. The step is located at a point where the power distribution from the radar is split in half, one-half illuminating the pylon above the step and one-half the power illuminating the pylon below the step.

It is important that the diameter range of the upper portion of the pylon (from the top of the pylon down to the diameter at the step) and the diameter range of the lower portion (from the step down to the bottom end) be selected to cause a phase change between the returning radar signals from each portion. This will cause returning radar signals from the upper and lower portions to cancel each other out reducing the RCS of the pylon.

The location of the step is determined by making physical measurements of the amplitude or power distribution of the radar and calculating the midpoint. The required diameter at the top of the pylon and there along to the step, and the top of the lower portion of the pylon (at the step) to the bottom of the pylon are determined from graphs (either theoretical or actual test results) of the phase shift as a function of the radius of a nontapered pylon across the frequency range required for the particular test. For example, if the frequency range is 350 to 450 mhz, a graph covering the test range, for example, 350, 400, and 450 mhz plots, is examined and diameter ranges are selected such that the diameter range of the upper portion of the pylon lies on one side of a phase shift and the lower portion on the opposite side. There will be some leeway in the selection of diameters that will allow for size limitations of the available foam material and, in particular, to a possible lower limit on the diameter of the top of the pylon to absorb the structural loads imposed by the model.

It must be noted that, sometimes, the diameter of the base could be extended outward past the point where a portion of the frequency range would again be in phase if a maximum RCS reduction is not necessary. This is acceptable because the power distribution near the ground plane is so low it has only a small effect on the overall RCS of the pylon. A larger base provides a more stable pylon.

The novel features that are believed to be characteristic of the invention, both to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side elevation view of a prior art tapered foam pylon.

Illustrated in FIG. 2 is a side elevation view of the subject tapered foam pylon having an abrupt change in diameter along its length forming a step about its periphery.

Figure 3:
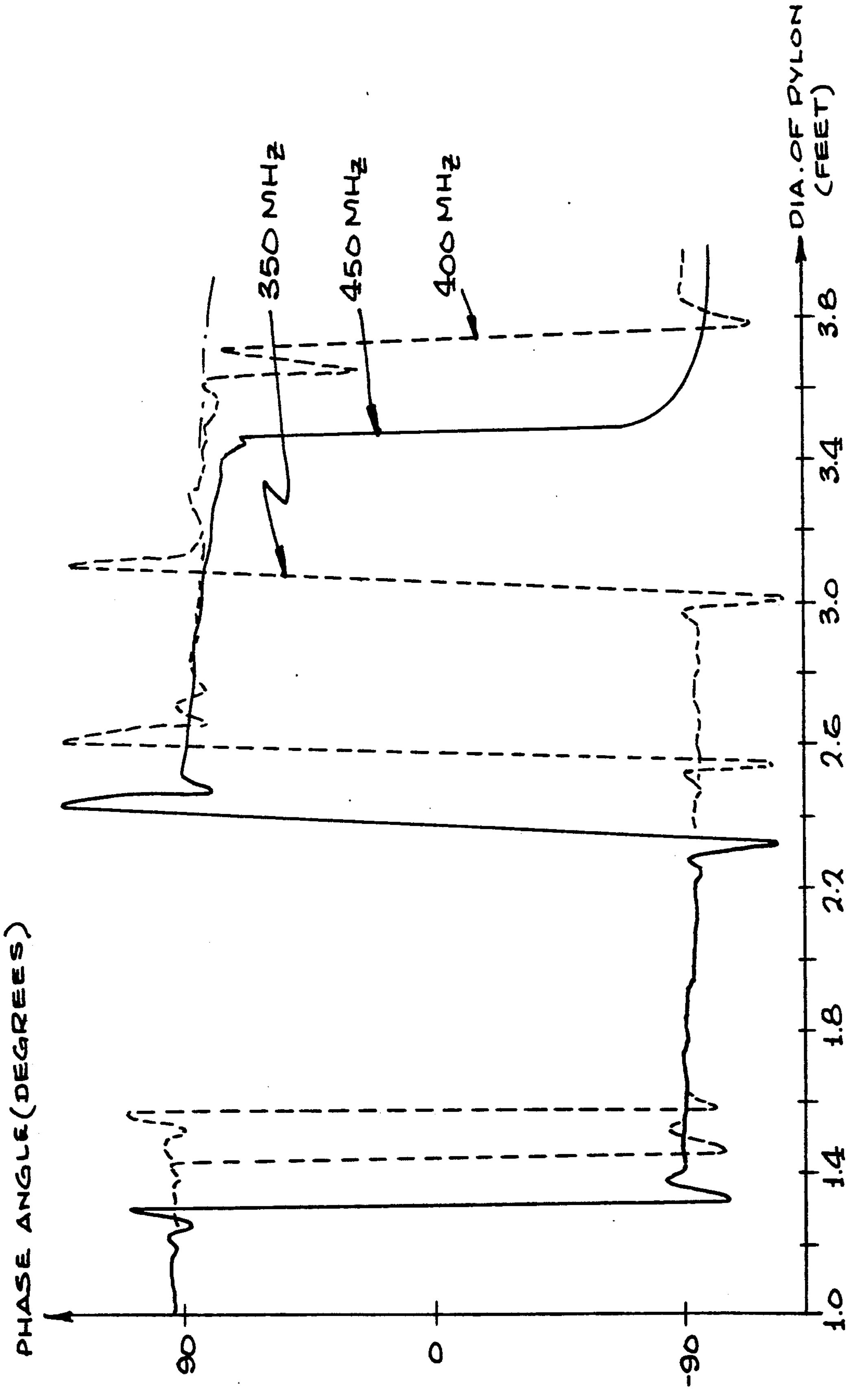

Illustrated in FIG. 3 is a graph of the phase shift as a function of the diameter of a nontapered foam pylon for the frequencies of 350, 400, and 450 mhz.

Illustrated in FIG. 4 is a table of the important dimensions for the subject pylon designed to be used for testing over the specific frequencies of 350, 400, and 450 mhz.

Illustrated in FIG. 5 is a table comparing the performance of the subject stepped and tapered foam pylon with a conventional tapered foam pylon demonstrating the increased performance of the subject pylon over the frequency range of 350 to 450 mhz.

DESCRIPTION OF THE PREFERRED EMBODIMENT

Figure 1:
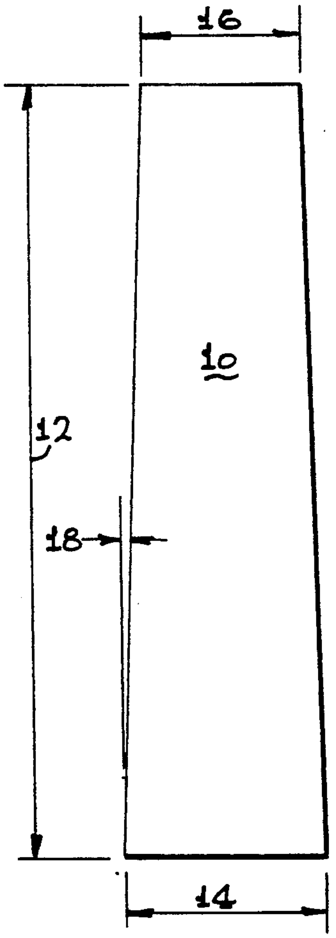
FIG. 1 PRIOR ART

Illustrated in FIG. 1 is a side elevation view of a prior art tapered foam pylon in use today, generally indicated by numeral 10. The pylon 10 has a height 12, a base diameter 14, a top diameter 16 and a taper angle 16. The pylon 10 must be made from a foam having a low dielectric constant of less than 1.1 and, preferably, 1.04 or less. For example, FALCON FOAM, manufactured by the Falcon Manufacturing Company, Los Angeles, Calif. has a dielectric constant of 1.04. A tapered pylon can be designed to have an extremely low RCS at a particular frequency, but the performance drops off considerably over a somewhat small frequency range. Thus, in situations where extremely low RCS models are to be tested over a significant frequency range, a tapered pylon is unusable.

Figure 2:
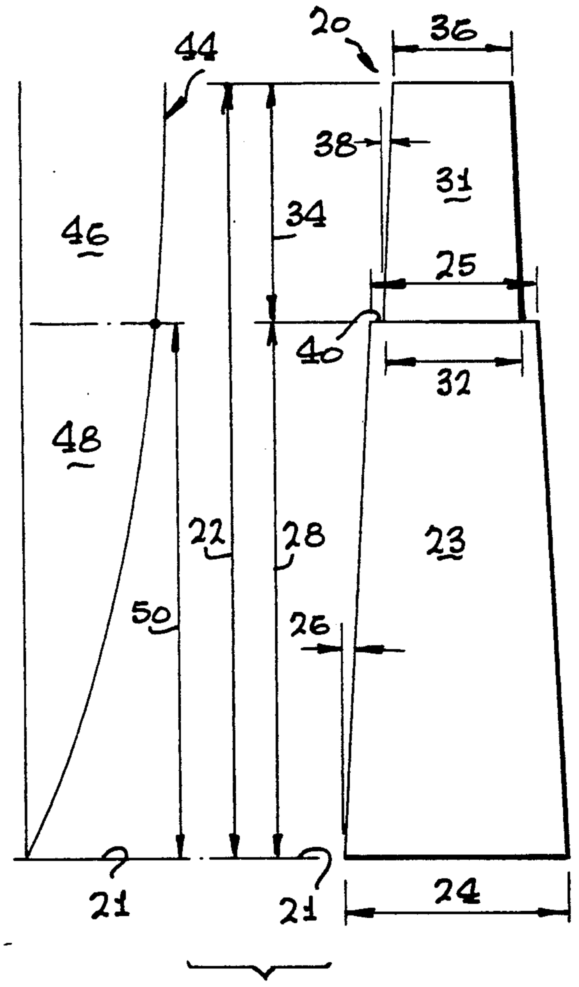

Illustrated in FIG. 2 is the subject pylon, indicated by numeral 20, mounted on a ground plane 21 and having an overall height, indicated by numeral 22. The pylon 20 includes a lower portion 23, mounted on the ground plane 21, having a base diameter 24, a top diameter 25, a taper angle 26 and a height 28. The pylon 20, further, includes an upper portion 31 having a base diameter 32, a height 34, an upper diameter 36 and a taper angle 38. Thus, because the upper diameter 25 of the lower portion 23 is larger than the base diameter 32 of the upper portion 31, a step 40 is formed therebetween. This step is critical to the performance of the subject pylon. As with the prior art tapered pylon 10, the subject pylon 20 is also made from a single piece of low dielectric constant foam.

Also schematically represented in FIG. 2 is the amplitude or power distribution of the radar signal, indicated by numeral 44. The power distribution curve, which can be experimentally determined for the particular radar, is generally a cosine function increasing in magnitude from the ground plane 21. The height 28 of the step 40 above the ground plane 21 is equal to the point 50 where the power distribution is divided equally into upper and lower parts, 46 and 48, respectively, Therefore, 50% of the power illuminates the top portion 31 while 50% illuminates the bottom portion 23. Note that because the power distribution is generally a cosine function, the 50% point is much closer to the top of the pylon 20 than the bottom. If the reflected energy from the upper portion of the pylon is 180 degrees out of phase with the reflected energy from the bottom portion, they will tend to cancel each other out, resulting in a significant reduction in the RCS of the pylon.

The phase shift is a function of the diameter at any given frequency. Thus, the allowable diameter range for the upper and lower tapered portions of the subject pylon can be determined by use of graphs indicating the phase shift as a function of diameter at a given frequency for a nontapered foam pylon. The phase shift for nontapered foam pylons can be calculated by various methods or determined experimentally. Illustrated in FIG. 3 is a calculated graph of the phase shift as a function of diameter (in feet) for the frequencies of 350, 400, and 450 mhz for a constant diameter foam pylon. Other frequencies would have similar curves.

Given this information, it is a simple matter to design the subject pylon for use in this frequency range. For example, suppose that a model requiring a two-foot diameter column at the top for support of the load of the model is to be tested over the frequency range of 350 to 450 mhz. Because, usually, the further above the ground plane the more accurate the measurements, assume a 14-foot-high pylon (the largest length available for the preferred foam). Additionally, assume that the 50% power split occurs at 69% of the total pylon length or 9.7 feet from the ground plane 21 (values for an actual radar). FIG. 3 shows that the phase transitions occur at about diameters of 2.3 and 3.10 feet providing overlapping diameter ranges of between about 1.62 to 3.0 feet and 3.1 to 3.4 feet. Thus, the critical dimensions are now all known and presented in FIG. 4.

Particularly referring to FIGS. 2 and 4, it can be seen that the upper and lower diameters 36 and 32, respectively, of the upper portion 31 are both on one side of a phase-shift overlap, while the base and upper diameters 24 and 32, respectively, of the lower portion 23 are on an opposite side of the phase shift. Thus, return signals from the upper and lower portions will tend to cancel each other out or at least substantially reduce the total RCS. Thus, by use of a low dielectric foam, a stepped pylon, dividing the pylon into two portions and proper selection of the diameter for each portion, a significant reduction in RCS is obtained. This can be seen in FIG. 5 which is a table comparing the performance of a conventional tapered foam pylon to the subject tapered foam pylon. In this table the dB loss for both the magnetic and electrical fields are presented as a function of frequency for both pylons.

It must be noted that, sometimes, the base diameter 24 could extend outward past the point of the phase change (a diameter greater than 3.4 feet) increasing the taper angle 26. Still, at least a portion of the diameter of the lower portion must be on the opposite side of the phase shift of the lower portion and it must start at the step. This may be acceptable if a maximum RCS reduction is not necessary because the power distribution near the ground plane is so low it has only a small effect on the total RCS of the pylon. Increasing the diameter of the base provides a more stable pylon.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has application to the aircraft industry and, in particular, to that portion of the aircraft industry involved in the development of low observable aircraft.

I claim:

1. A pylon for supporting a model above a ground plane for radar cross-section testing using a radar providing a specific frequency range and power distribution above the ground plane, the pylon comprising a column made of a low dielectric constant foam material having a base end for mounting on the ground plane, a model mounting top end and a generally circular cross-section, said column having an abrupt change in diameter at a point between said ends forming a step and dividing said column into upper and lower tapered portions with each of said tapered portions having a specific diameter range, said step located at a point on said column such that the power is evenly split between said upper and said lower portions and said specific diameter range of said upper portion and at least a portion of the diameter range of the lower portion selected to maintain a 180-degree phase change in the return signal between each of said portions reducing the RCS of the pylon.

2. The pylon as set forth in claim 1 wherein said at least a portion of said diameter range of said lower portion includes that portion starting from said step.

3. The pylon as set forth in claim 2 wherein said at least a portion of said diameter range of said lower portion includes the entire diameter range of said lower portion.

4. The pylon as set forth in claim 3 wherein said dielectric constant is no more than 1.10.

5. The pylon as set forth in claim 4 wherein said dielectric constant is no more than 1.04.

* * * * *